J. BADER.
MOWING MACHINE.
APPLICATION FILED JAN. 24, 1910.
999,291.
Patented Aug. 1, 1911.
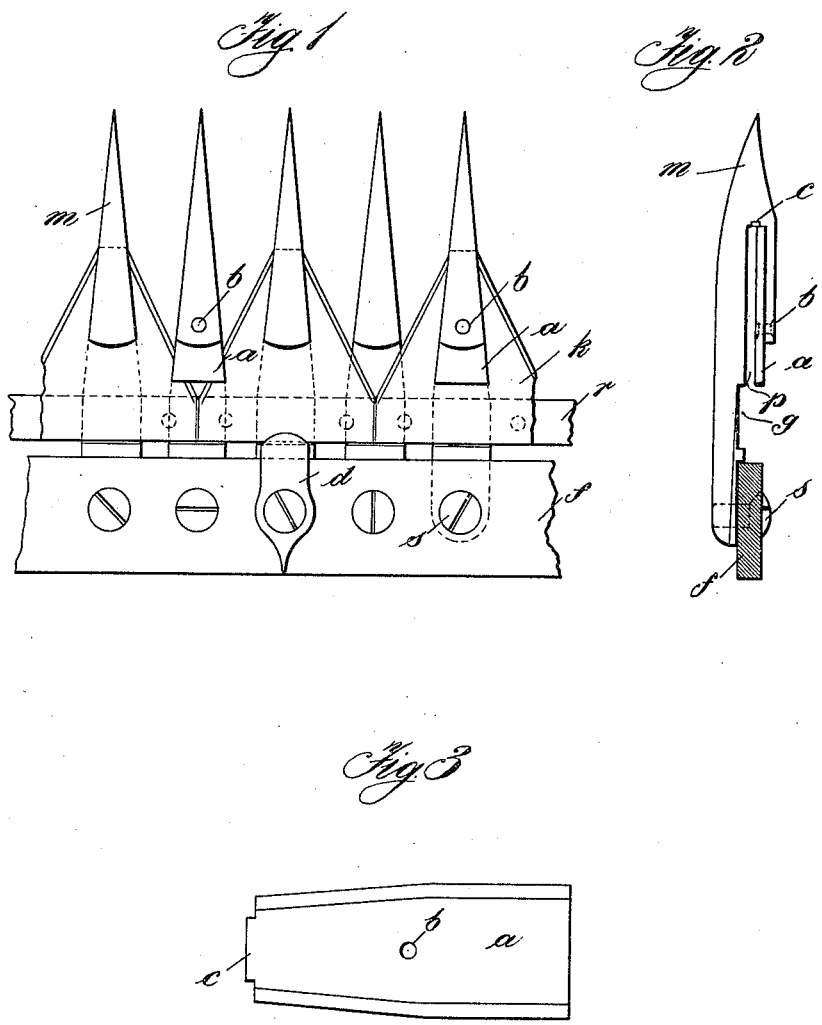
Witnesses
Inventor
Joseph Bader
by Carl Gewes.
His Attorney

UNITED STATES PATENT OFFICE.

JOSEPH BADER, OF BUCHLOE, GERMANY.

MOWING-MACHINE.

999,291.  Specification of Letters Patent.  Patented Aug. 1, 1911.

Application filed January 24, 1910. Serial No. 539,860.

*To all whom it may concern:*

Be it known that I, JOSEPH BADER, a subject of the German Emperor, and resident of Buchloe, Bavaria, Germany, have invented Improvements in Mowing-Machines, of which the following is a specification.

The subject of the present invention relates to improvements in mowing machines, and more especially to that part which may be termed the knife guide.

The essential features consist in the provision of metal tongues provided with sharp edges and adapted to be secured in a recess in every third or fourth guard finger of the mowing machine. The tongues are adapted to be securely fixed in position in such a way that as the knives are moved laterally, any clay, earth, grass or foreign bodies lying on their upper surfaces will be scraped off by the sharp edges of the tongues.

In order that the invention may be clearly understood, reference is made to the accompanying drawing, in which:—

Figure 1 is a plan showing the application of the tongues. Fig. 2 is a side elevation showing a tongue in position in a recess of a guard finger, while Fig. 3 is a plan of a tongue.

The tongue $a$ is preferably of the shape shown in Figs. 2 and 3 and is also preferably made of the best hardened Bessemer steel. One of these tongues is provided for every third or every fourth guard finger $m$ (see Fig. 1) and is preferably secured in position in a recess in the guard finger by a rivet $b$, in such a manner that a space $p$ is left for the knife $k$, (Fig. 2). The knives $k$ are secured to the reciprocating bar $r$ in any desired manner, while the guard fingers $m$ are secured to the finger bar $f$ by screws $s$ or the like. The tongue $a$ is provided with an integral projection $c$ which fits into a suitable recess in the member $m$ in such a way that all lateral movement or displacement is prevented.

The reciprocating bar $r$ fits into and is adapted to slide in a groove $g$ in the guard fingers $m$ while knives are adapted to slide in the space $p$ (Fig. 2) which is provided between the guard finger $m$ and the under side of the tongue $a$. The latter, as will be apparent from Fig. 3 tapers slightly toward the projection $c$ while the edges of the longer sides are made very sharp. A thumb piece $d$ is provided to prevent the bar $r$ from jumping out of or disengaging from the groove $g$, but with the provision of the tongues $a$, this piece can be omitted. Thus when the bar is reciprocated the knives will slide backward and forward under the tongue $a$, so that all earth, clay, pieces of grass or foreign bodies lying on the upper surface of the knives will be scraped off by the sharp edges of the tongues.

Having now fully described my invention, what I claim and desire to secure by Letters Patent is:—

In mowing machines, the combination with a reciprocating bar $r$ of guard fingers $m$ having slots $p$, tongues $a$ of hardened steel, the said tongues being secured in said slots on the upper side thereof and slightly tapered in shape with the edges of the longer sides being made sharp, integral projections provided at the narrower end of said tongues, and cutter blades attached to the said reciprocating bar and cutting on the lower edge of the lower side of the slot, substantially as and for the purpose specified.

In witness whereof I have hereunto set my hand in the presence of two subscribing witnesses.

JOSEPH BADER.

Witnesses:
 JOHAN LANGENBÖL,
 LOUIS MUELLER.

Copies of this patent may be obtained for five cents each, by addressing the "Commissioner of Patents, Washington, D. C."